United States Patent
Watanabe

(10) Patent No.: US 9,594,987 B2
(45) Date of Patent: Mar. 14, 2017

(54) PRINTING SYSTEM, PRINTING METHOD AND COMPUTER-READABLE RECORDING MEDIUM

(71) Applicant: Mie Watanabe, Tokyo (JP)

(72) Inventor: Mie Watanabe, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/060,767

(22) Filed: Oct. 23, 2013

(65) Prior Publication Data

US 2014/0111829 A1    Apr. 24, 2014

(30) Foreign Application Priority Data

Oct. 24, 2012    (JP) ................................. 2012-234547

(51) Int. Cl.
*G06K 15/02* (2006.01)
*G06F 3/12* (2006.01)

(52) U.S. Cl.
CPC ....... *G06K 15/1806* (2013.01); *G06F 3/1212* (2013.01); *G06F 3/1267* (2013.01); *G06F 3/1285* (2013.01); *G06F 2206/1514* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0171868 A1* | 11/2002 | Yoshimura | ............ | G06F 3/1208 358/1.15 |
| 2004/0190057 A1* | 9/2004 | Takahashi | ............. | G06F 3/1205 358/1.15 |
| 2005/0214017 A1* | 9/2005 | Isobe | ..................... | B41J 13/106 399/82 |
| 2007/0146737 A1* | 6/2007 | Morimoto | ..................... | 358/1.2 |
| 2008/0049242 A1* | 2/2008 | Kimura | ............. | H04N 1/00222 358/1.12 |
| 2008/0239398 A1* | 10/2008 | Nakagiri | ................ | G06K 15/02 358/1.18 |
| 2009/0273804 A1* | 11/2009 | Kobashi | ................ | G06F 3/1205 358/1.15 |
| 2009/0307264 A1* | 12/2009 | Makishima | ............. | G06F 9/543 |
| 2010/0259785 A1* | 10/2010 | Mori | ..................... | G06F 3/1205 358/1.15 |

(Continued)

FOREIGN PATENT DOCUMENTS

JP     2010-137449     6/2010

*Primary Examiner* — Hilina K Demeter

(74) *Attorney, Agent, or Firm* — Oblon, McClelland, Maier & Neustadt, L.L.P.

(57) ABSTRACT

The printing system according to the present invention includes a specifying unit configured to specify specified data from print object data of a print job containing the print object data and a print setting of the print object data, the specified data representing the print object data to be printed; a partial extraction unit configured to extract the specified data and a partial print setting from the print job, the partial print setting representing the print setting to be applied to the specified data; a job generation unit configured to newly generate a print job containing the specified data and the partial print setting; and a printing unit configured to print an image based on the generated print job.

5 Claims, 5 Drawing Sheets

(56) References Cited

U.S. PATENT DOCUMENTS

2013/0003125 A1* 1/2013 Morii ................. G06K 15/1817
    358/1.15
2014/0168666 A1* 6/2014 Sakurai ................. G06F 3/1208
    358/1.2

* cited by examiner

PRINTING SYSTEM, PRINTING METHOD AND COMPUTER-READABLE RECORDING MEDIUM

CROSS-REFERENCE TO RELATED APPLICATIONS

The present application claims priority to and incorporates by reference the entire contents of Japanese Patent Application No. 2012-234547 filed in Japan on Oct. 24, 2012.

BACKGROUND OF THE INVENTION

1. Field of the Invention

The present invention relates to a printing system, a printing method and a computer-readable recording medium.

2. Description of the Related Art

There is known a printing system of sending print object data and a print setting of the print object data (hereinafter referred to as "print data") from an information processing apparatus such as a PC (Personal Computer) to an image formation apparatus such as a printer and an MFP. The print object data is document data, image data, or the like. The print setting is a print color setting (monochrome or color), or setting of print quality or the like.

In general, the printing system manages print data submitted to the image formation apparatus as a print job. Also, there is known a function of displaying a print job as a print history containing a name of print object data and a print setting used when the print object data was printed. Also, there are known a print job editing function, an output function, and the like.

As a technique regarding a print job, there is known a printing control apparatus disclosed in Japanese Patent Application Laid-open No. 2010-137449. According to the printing control apparatus disclosed in Japanese Patent Application Laid-open No. 2010-137449, when an image control apparatus prints an image according to a print job containing a large amount of pages and thereafter reprints pages of a plurality of locations in the print job, the image control apparatus can efficiently reprint the pages without affecting other print jobs.

However, a conventional printing system extracts all print data of a print job, even when only a part of the print data of a print job is used. Therefore, even when only a part of print data of a print job is used, time is taken to execute a print job when the size of print data is large.

The present invention has been made in view of the above. An object of the present invention is to provide a printing system, a printing method and a program enabling utilization of only a part of print data of a print job.

SUMMARY OF THE INVENTION

It is an object of the present invention to at least partially solve the problems in the conventional technology.

According to the present invention, there is provided: a printing system comprising: a specifying unit configured to specify specified data from print object data of a print job containing the print object data and a print setting of the print object data, the specified data representing the print object data to be printed; a partial extraction unit configured to extract the specified data and a partial print setting from the print job, the partial print setting representing the print setting to be applied to the specified data; a job generation unit configured to newly generate a print job containing the specified data and the partial print setting; and a printing unit configured to print an image based on the generated print job.

The present invention also provides a printing method comprising: a step of a specifying unit specifying specified data from print object data of a print job containing the print object data and a print setting of the print object data, the specified data representing the print object data to be printed; a step of a partial extraction unit extracting the specified data and a partial print setting from the print job, the partial print setting representing the print setting to be applied to the specified data; a step of a job generation unit newly generating a print job containing the specified data and the partial print setting; and a step of a printing unit printing an image based on the generated print job.

The present invention also provides a non-transitory computer-readable recording medium that contains a computer program that causes a computer to function as: a specifying unit configured to specify specified data from print object data of a print job containing the print object data and a print setting of the print object data, the specified data representing the print object data to be printed; a partial extraction unit configured to extract the specified data and a partial print setting from the print job, the partial print setting representing the print setting to be applied to the specified data; a job generation unit configured to newly generate a print job containing the specified data and the partial print setting; and a printing unit configured to print an image based on the generated print job.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the printing system and the printing method and program that is stored in a computer-readable recording medium will be described in detail below with reference to accompanying drawings.

Figure 1:
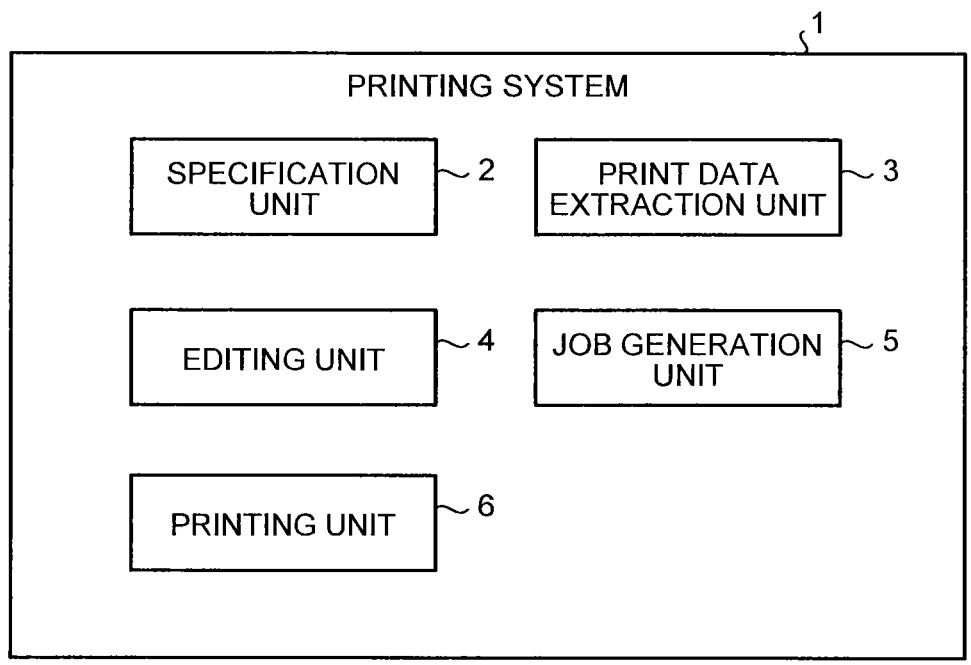
FIG. 1 is a block diagram depicting an example of functional blocks of the printing system according to the present embodiment.

FIG. 1 is a block diagram depicting an example of functional blocks of a printing system 1 according to the present embodiment. The printing system 1 according to the present embodiment includes a specifying unit 2, a print data extraction unit 3, an editing unit 4, a job generation unit 5, and a printing unit 6.

Figure 2:
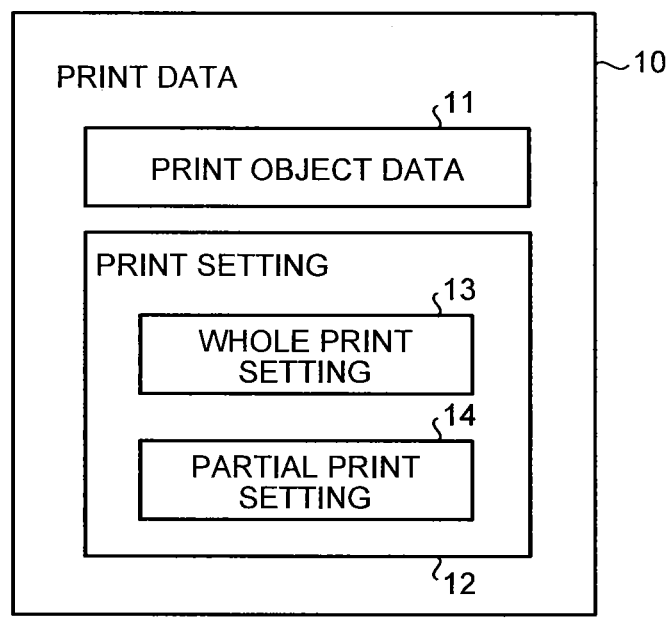
FIG. 2 is a diagram depicting an example of print data contained in a print job of the printing system according to the present embodiment.

FIG. 2 is a diagram depicting an example of print data 10 contained in a print job of the printing system 1 according to the present embodiment. The print data 10 has print object data 11 and a print setting 12. The print setting 12 has a whole print setting 13 and a partial print setting 14.

First, the print data 10 contained in a print job of the printing system 1 according to the present embodiment will be described. The print object data 11 is data to be printed by the printing unit 6. The print setting 12 is a setting to be applied when the printing unit 6 prints the print object data 11. The print setting 12 is, for example, a print color setting (monochrome or color), and a setting of print quality or the like.

Figure 3:
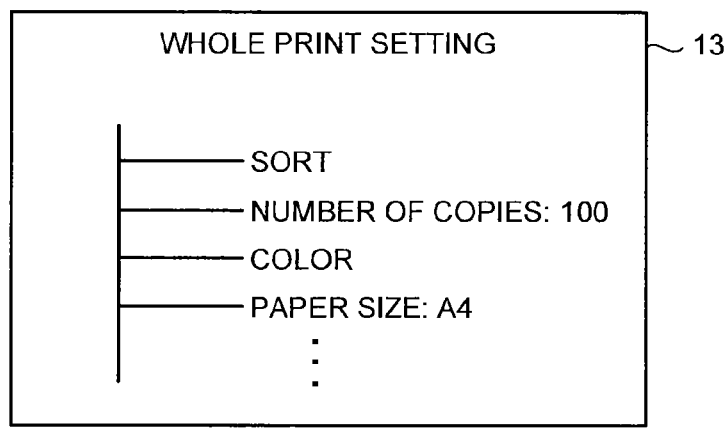
FIG. 3 is a diagram depicting an example of a whole print setting of print data of the printing system according to the present embodiment.

The whole print setting 13 is a setting to be applied to a whole range of the print object data 11. FIG. 3 is a diagram depicting an example of the whole print setting 13 of the print data 10 of the printing system 1 according to the present embodiment. In an example of the whole print setting 13 in FIG. 3, sort for sorting and ejecting paper into each copy, the number of copies of 100, color print, and paper size of A4 are set.

Figure 4:
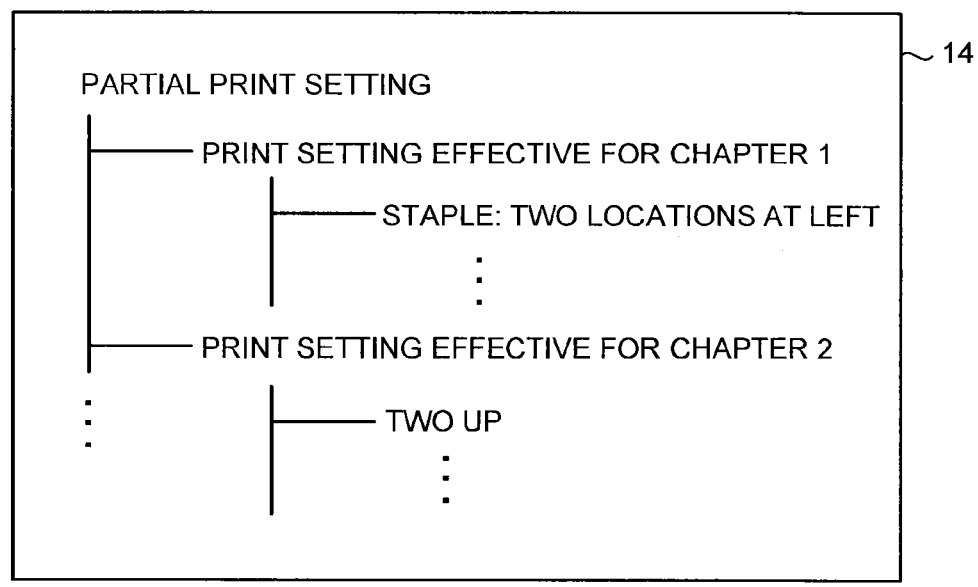
FIG. 4 is a diagram depicting an example of a partial print setting of print data of the printing system according to the present embodiment.

The partial print setting 14 is a setting to be applied to a partial range of the print object data 11. FIG. 4 is a diagram depicting an example of the partial print setting 14 of the print data 10 of the printing system 1 according to the present embodiment. In an example of the partial print setting 14 in FIG. 4, as a print setting effective for Chapter 1 of the print object data 11, a setting in which two locations on the left of a printed matter are stapled is established. Also, as a print setting effective for Chapter 2 of the print object data 11, a setting in which the print object data 11 is printed in a two-up format on a printing paper is established.

Returning to FIG. 1, the specifying unit 2 specifies the print object data 11 to be printed (hereinafter referred to as "specified data"), from the print object data 11 of a print job containing the print object data 11 and the print setting 12 of the print object data 11, based on an input by a user of the printing system 1. In this case, the specifying unit 2 may specify a setting to be applied when the specified data is printed at the same time as specifying the specified data, based on an input by a user of the printing system 1.

Figure 5:
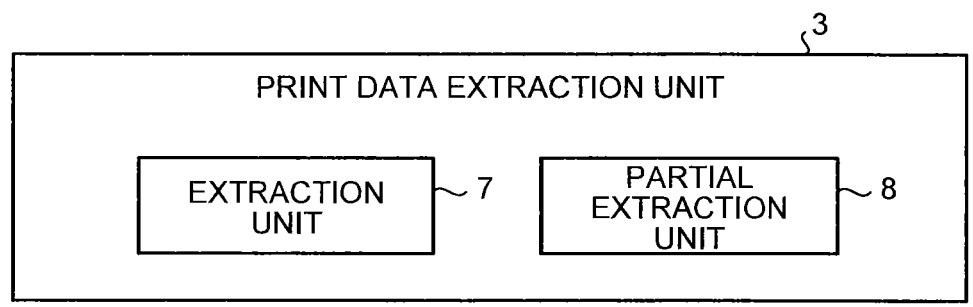
FIG. 5 is a block diagram depicting an example of functional blocks of a print data extraction unit of the printing system according to the present embodiment.
Figure 6:
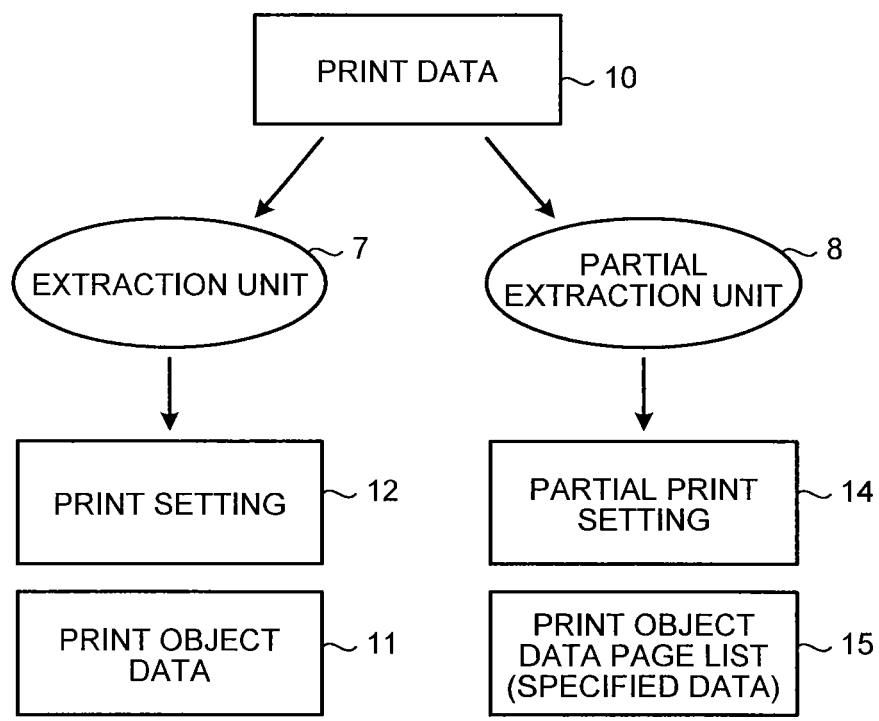
FIG. 6 is a diagram for explaining an example of an operation method of an extraction unit and a partial extraction unit of the printing system according to the present embodiment.

The print data extraction unit 3 extracts data from the print data 10 of a print job. FIG. 5 is a block diagram depicting an example of functional blocks of the print data extraction unit 3 of the printing system 1 according to the present embodiment. The print data extraction unit 3 includes an extraction unit 7 and a partial extraction unit 8. FIG. 6 is a diagram for explaining an example of an operation method of the extraction unit 7 and the partial extraction unit 8 of the printing system 1 according to the present embodiment.

The extraction unit 7 extracts the print setting 12 and the print object data 11 from the print data 10. The partial extraction unit 8 extracts the partial print setting 14 and a print object data page list (specified data) 15 from the print data 10.

Returning to FIG. 1, the editing unit 4 edits, when the specifying unit 2 specifies a setting to be applied when specified data is printed at the same time as specifying the specified data, the data extracted by the print data extraction unit 3 based on the specification.

The job generation unit 5 newly generates a print job containing the data extracted by the partial extraction unit 8 (the partial print setting 14 and the print object data page list (specified data) 15).

Thus, the data size of the print data 10 of a print job can be reduced. Accordingly, a memory capacity to be used for queuing of a print job can be decreased, and a time for processing a print job can be shortened.

In a case of a print job of the data extracted by the extraction unit (the print setting 12 and the print object data 11), an existing print job may be used. This is because the data size of the data extracted by the extraction unit 7 is the same as that of the print data 10.

The printing unit 6 prints an image based on the print data 10 of a print job.

Figure 7:
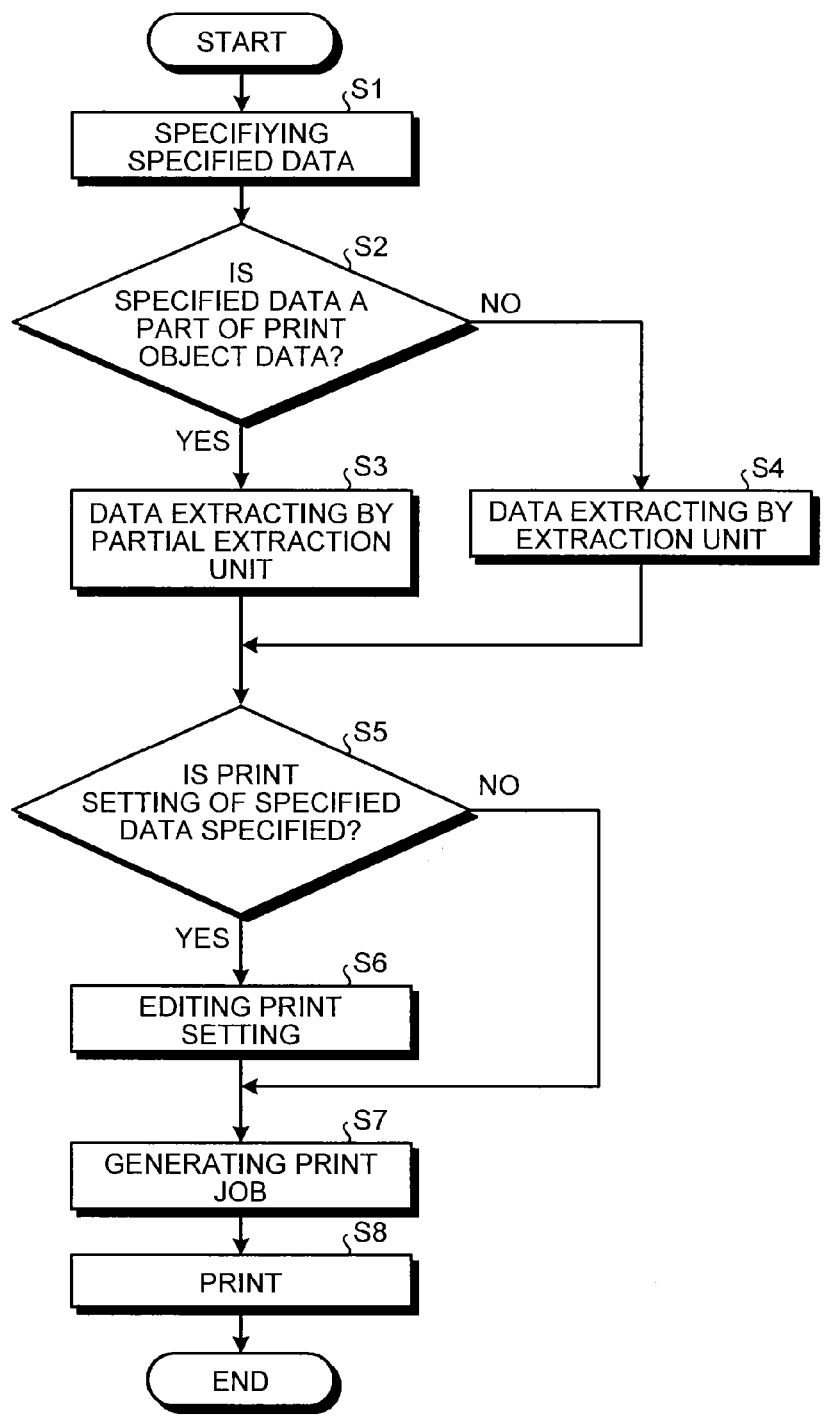
FIG. 7 is a flowchart for explaining an example of a printing method of the printing system according to the present embodiment.

FIG. 7 is a flowchart for explaining an example of a printing method of the printing system 1 according to the present embodiment. The specifying unit 2 specifies specified data from the print object data 11 of a print job containing the print object data 11 and the print setting 12 of the print object data 11, based on an input by a user of the printing system 1 (Step S1).

Furthermore, in Step S1, the specifying unit 2 may specify a setting to be applied when the specified data is printed at the same time as specifying the specified data, based on an input by a user of the printing system 1.

The print data extraction unit 3 determines whether or not the specified data is a part of the print object data 11 (Step S2). When the data is a part of the print object data 11 (Step S2, Yes), the data is extracted by the partial extraction unit 8 (Step S3). When the data is all of the print object data 11 (Step S2, No), the data is extracted by the extraction unit 7 (Step S4).

The editing unit 4 determines whether or not the specifying unit 2 specifies a setting to be applied when the specified data is printed at the same time as specifying the specified data (Step S5). When a setting to be applied when the specified data is printed is specified (Step S5, Yes), the editing unit 4 edits the data extracted by the print data extraction unit 3 according to the specification (Step S6). When a setting to be applied when the specified data is printed is not specified (Step S5, No), the operation proceeds to Step S7.

The job generation unit 5 newly generates a print job containing the data extracted by the partial extraction unit 8 (the partial print setting 14 and the print object data page list (specified data) 15) (Step S7). With respect to a print job of the data extracted by the extraction unit (the print setting 12 and the print object data 11), an existing print job may be used, or a print job may be newly generated.

The printing unit 6 prints an image based on the print data 10 of a print job (Step S8).

Figure 8:
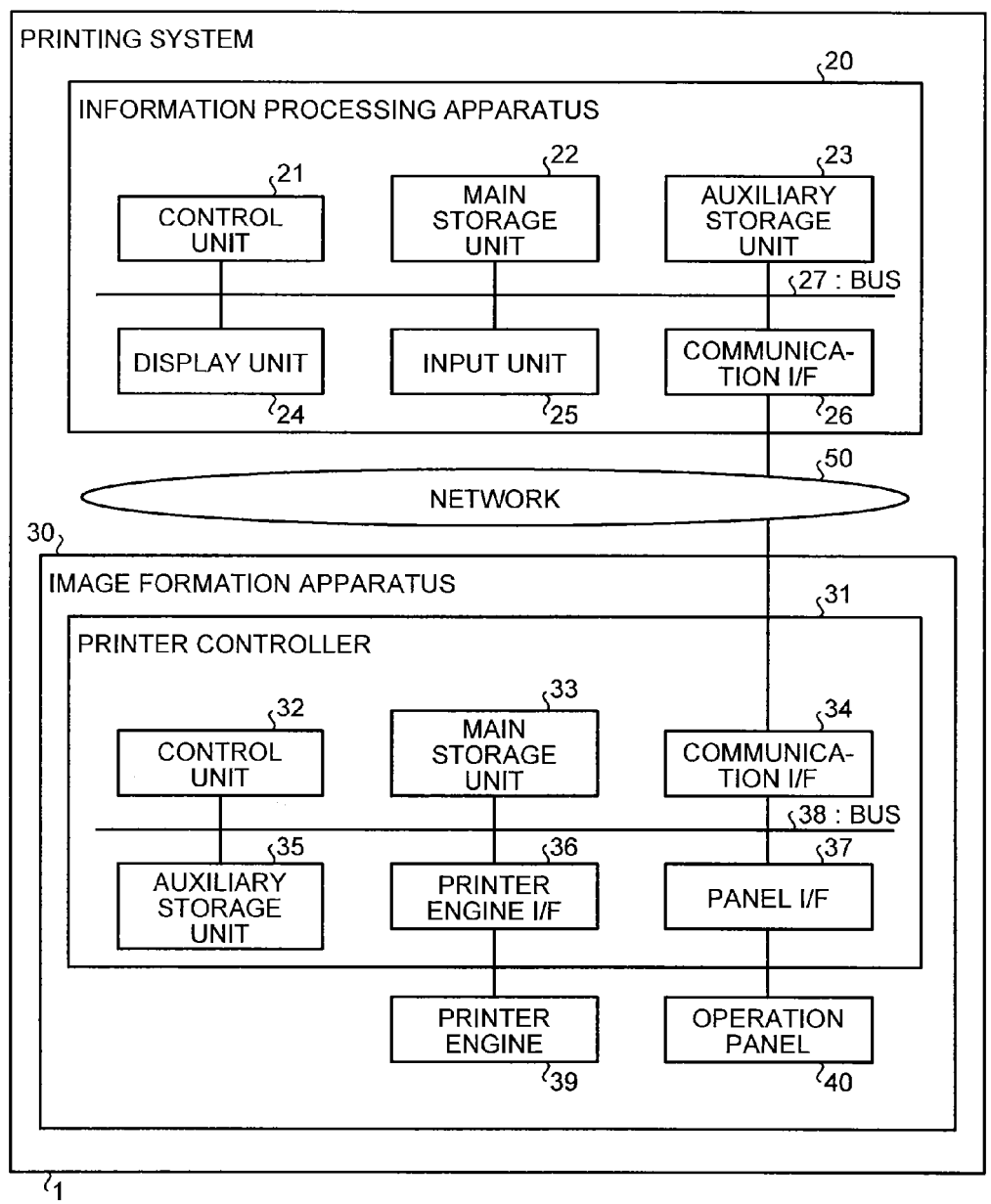
FIG. 8 is a diagram depicting an example of the hardware configuration of the printing system according to the present embodiment.

Next, the hardware configuration of the printing system 1 according to the present embodiment will be described. FIG. 8 is a diagram depicting an example of the hardware configuration of the printing system 1 according to the present embodiment. The printing system 1 according to the present embodiment includes an information processing apparatus 20 and an image formation apparatus 30.

The information processing apparatus 20 includes a control unit 21, a main storage unit 22, an auxiliary storage unit 23, a display unit 24, an input unit 25, and a communication I/F 26. The control unit 21, the main storage unit 22, the auxiliary storage unit 23, the display unit 24, the input unit 25, and the communication I/F 26 are connected to each other via a bus 27.

The image formation apparatus 30 includes a printer controller 31, a printer engine 39, and an operation panel 40. The printer controller 31 includes a control unit 32, a main storage unit 33, a communication I/F 34, an auxiliary storage unit 35, a printer engine I/F 36, and a panel I/F 37. The control unit 32, the main storage unit 33, the communication I/F 34, the auxiliary storage unit 35, the printer engine I/F 36, and the panel I/F 37 are connected to each other via a bus 38.

The information processing apparatus 20 and the image formation apparatus 30 are connected to each other via a network 50 by the communication I/F 26 and the communication I/F 34. In this case, the communication system of the communication I/F 26 may be wired or wireless. Similarly, the communication system of the communication I/F 34 may be wired or wireless.

First, the hardware configuration of the information processing apparatus 20 will be described. The control unit 21 executes a program developed from the auxiliary storage unit 23 to the main storage unit 22. The main storage unit 22 is ROM (Read Only Memory), RAM (Random Access Memory), or the like. The auxiliary storage unit 23 is a HDD (Hard Disk Drive), an optical drive, or the like. The display unit 24 is a liquid crystal display or the like. The input unit 25 is a keyboard, a mouse, or the like. The communication I/F 26 is an interface for connecting to the network 50.

Next, the hardware configuration of the image formation apparatus 30 will be described. The control unit 32 executes a program developed from the auxiliary storage unit 35 to the main storage unit 33. The main storage unit 33 is ROM, RAM, or the like. The auxiliary storage unit 35 is a HDD (Hard Disk Drive), an optical drive, or the like. The communication I/F 34 is an interface for connecting to the network 50.

The panel I/F 37 is an interface between the printer controller 31 and the operation panel 40. The operation panel 40 is a liquid crystal panel or the like to allow a user to set the image formation apparatus 30. The printer engine I/F 36 is an interface between the printer controller 31 and the printer engine 39. The printer engine 39 prints an image based on an image printing instruction from the printer controller 31.

Here, the correspondence between the functional blocks and the hardware configuration of the printing system 1 according to the present embodiment will be described. The specifying unit 2, the print data extraction unit 3, the editing unit 4, and the job generation unit 5 described above may be realized as software. That is, the specifying unit 2, the print data extraction unit 3, the editing unit 4, and the job generation unit 5 may be developed to the main storage unit 22 or the main storage unit 33 to be executed by the control unit 21 or the control unit 32. The printing unit 6 corresponds to, for example, the image formation apparatus 30.

A program to be executed in the printing system 1 according to the present embodiment is recorded in a recording media readable by a computer, such as a CD-ROM, a flexible disk (FD), a CD-R, and a DVD (Digital Versatile Disk), in a file of an installable format or an executable format, and the recorded program is provided as a computer program product.

Also, a program to be executed in the printing system 1 according to the present embodiment may be provided by storing the program in a computer connected to a network such as the Internet and allowing a user to download the program via a network. Also, a program to be executed in the printing system 1 according to the present embodiment may be provided or distributed via a network such as the Internet.

Also, a program of the printing system 1 according to the present embodiment may be provided by previously incorporating the program into ROM or the like.

A program to be executed in the printing system 1 according to the present embodiment has a module configuration containing the above-mentioned blocks (the specifying unit 2, the print data extraction unit 3, the editing unit 4, and the job generation unit 5). With respect to the functional blocks, as actual hardware, the control unit 21 or the control unit 32 retrieves a program from the above-described recording medium and executes the retrieved program, thereby to load the above-described functional blocks to the main storage unit 22 or the main storage unit 33. That is, the above-described functional blocks are generated in the main storage unit 22 or the main storage unit 33.

In this case, a part or all of the above-described functional blocks (the specifying unit 2, the print data extraction unit 3, the editing unit 4, and the job generation unit 5) may not be realized by software, and may be realized by hardware such as an IC.

As described above, according to the printing system and the printing method and program of the present embodiment, utilization of only a part of print data of a print job is enabled. Thus, the size of the print data 10 of a print job can be reduced. Accordingly, a memory capacity to be used for queuing of a print job can be decreased, and a time for processing a print job can be shortened.

According to an embodiment of the invention, an effect is exerted in that a printing system, a printing method and a program enabling utilization of only a part of print data of a print job can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system, comprising:
   circuitry configured to:
   specify data to be partially printed by chapter from print object data of a print job, the data to be partially printed by chapter representing data of a chapter selected to be partially printed from the print object data, and the print job including
   the print object data,
   a print setting applied to all of the print object data, and
   a post-process setting applied to all of the print object data;
   determine, after the data is specified, whether the data includes all of the print object data or whether the data includes less than all of the print object data;
   extract, from the print object data of the print job when the data is determined to include less than all of the print object data, the data and a partial process setting including a partial print setting and a partial post-process setting, the partial print setting representing the print setting to be applied to the data for partial printing, and the partial post-process setting representing the post-process setting to be applied to the data after the partial printing;
   extract, when the data is determined to include all of the print object data, the data, the print setting applied to all of the print object data and the post-process setting applied to all of the print object data
edit, when a setting to be applied is specified and the data is printed, the data extracted according to the setting;
generate the print job to include the edited data; and
print an image according to the print job, wherein
the data is a print object data page list.

2. The printing system according to claim 1, wherein the circuitry is further configured to:
specify the partial process setting and the post-process setting to be applied to the specified data by chapter,
edit the partial process setting based on the print setting and the post-process setting specified by chapter, and
generate the print job to include the edited partial process setting and the data.

3. The printing system according to claim 1, wherein the circuitry is further configured to extract the print object data when the data is determined to include less than all of the print object data.

4. A printing method, comprising:
specifying, by circuitry of a printing system, data to be partially printed by chapter from print object data of a print job, the data to be partially printed by chapter representing data of a chapter selected to be partially printed from the print object data, and the print job including
the print object data,
a print setting applied to all of the print object data, and
a post-process setting applied to all of the print object data;
determining, after the data is specified, whether the data includes all of the print object data or whether the data includes less than all of the print object data;
extracting, by the circuitry from the print object data of the print job when the data is determined to include less than all of the print object data, the data and a partial process setting including a partial print setting and a partial post-process setting, the partial print setting representing the print setting to be applied to the data for partial printing, and the partial post-process setting representing the post-process setting to be applied to the data after the partial printing;
editing, when a setting to be applied is specified and the data is printed, the data extracted according to the setting;
generating the print job to include the edited data; and
printing an image according to the print job, wherein
the specified data is a print object data page list.

5. A non-transitory computer-readable recording medium that contains a computer program that, when executed by a computer, causes the computer to execute a method, the method comprising:
specifying data to be partially printed by chapter from print object data of a print job, the data to be partially printed by chapter representing data of a chapter selected to be partially printed from the print object data, and the print job including
the print object data,
a print setting applied to all of the print object data, and
a post-process setting applied to all of the print object data;
determining, after the data is specified, whether the data includes all of the print object data or whether the data includes less than all of the print object data;
extracting from the print object data of the print job when the data is determined to include less than all of the print object data, the data and a partial process setting including a partial print setting and a partial post-process setting, the partial print setting representing the print setting to be applied to the data for partial printing, and the partial post-process setting representing the post-process setting to be applied to the data the partial printing;
editing, when a setting to be applied is specified and the data is printed, the data extracted according to the setting;
generating the print job to include the edited data; and
printing an image according to the print job, wherein
the specified data is a print object data page list.

* * * * *